US007466090B2

(12) United States Patent
Meewis et al.

(10) Patent No.: US 7,466,090 B2
(45) Date of Patent: Dec. 16, 2008

(54) APPARATUS, SOFTWARE AND METHOD FOR CONTROLLING THE OPERATION OF A WINDOW COVERING

(75) Inventors: Henk Jan Meewis, Arvada, CO (US); James L. Miller, Henderson, CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 0 days.

(21) Appl. No.: 11/573,654

(22) PCT Filed: Aug. 29, 2005

(86) PCT No.: PCT/US2005/031012

§ 371 (c)(1),
(2), (4) Date: Feb. 13, 2007

(87) PCT Pub. No.: WO2006/026682

PCT Pub. Date: Mar. 9, 2006

(65) Prior Publication Data

US 2007/0221338 A1 Sep. 27, 2007

Related U.S. Application Data

(60) Provisional application No. 60/605,900, filed on Aug. 30, 2004.

(51) Int. Cl.
*H02P 1/00* (2006.01)

(52) U.S. Cl. ....................... 318/280; 318/283; 318/466; 318/603; 160/84.02; 160/166.1

(58) Field of Classification Search ................. 318/280, 318/282, 283, 286, 466, 468, 603, 626; 160/84.02, 160/166.1, 167 R, 168.1 P
See application file for complete search history.

(56) References Cited

U.S. PATENT DOCUMENTS

| | | | | |
|---|---|---|---|---|
| 4,727,918 | A | 3/1988 | Schroeder | |
| 5,170,108 | A | 12/1992 | Peterson et al. | |
| 5,603,371 | A | 2/1997 | Gregg | |
| 5,990,646 | A | 11/1999 | Kovach et al. | |
| 6,369,530 | B2 * | 4/2002 | Kovach et al. | 318/16 |
| 6,388,404 | B1 | 5/2002 | Schnebly et al. | |
| 6,497,267 | B1 | 12/2002 | Azar et al. | |
| 2002/0175276 | A1 * | 11/2002 | Smith et al. | 250/231.13 |
| 2004/0169133 | A1 * | 9/2004 | Smith et al. | 250/231.14 |
| 2005/0039865 | A1 | 2/2005 | Bruno et al. | |

* cited by examiner

*Primary Examiner*—Rina Duda
(74) *Attorney, Agent, or Firm*—Dorsey & Whitney LLP

(57) ABSTRACT

Systems, methods, apparatus, computer readable mediums and propagated signals are provided for controlling the position, orientation, movement, configuration and/or operation of one or more window coverings, doors, vanes, filters or other apparatus. In one embodiment, a system is provided for controlling at least one of the position and orientation of a blind. The system includes a controller for operating a blind, at least one detector operably connected to the controller for simultaneously detecting position and orientation of at least one element of the blind, and at least one output device operably connected to the controller for controlling at least one of the orientation and position of the blind. The embodiments may also include or utilize at least one of a receiver program module, a device controller module, a timer program module and a system controller module which are utilized by a controller to control the operation of the blind.

27 Claims, 6 Drawing Sheets

APPARATUS, SOFTWARE AND METHOD FOR CONTROLLING THE OPERATION OF A WINDOW COVERING

CROSS REFERENCE TO RELATED APPLICATIONS

The present application claims priority to U.S. Provisional Patent Application Ser. No. 60/605,900 filed Aug. 30, 2004 in the name of inventors Henk Jan Meewis and James L. Miller and entitled “Apparatus, Software and Method for Controlling the Operation of a Window Covering”, the entire contents of which are incorporated herein by reference.

INVENTIVE FIELD

The inventive field generally relates to apparatus, systems and methods for controlling window coverings, adjustable coverings and openings. More specifically, the inventive field relates to automated systems for controlling the positioning, adjustment, movement, orientation and/or operation of adjustable coverings and openings.

BACKGROUND

Window coverings come in various sizes, types and configurations. Generally, it is desirable for owners and operators of such window coverings to be able to automatically adjust the position, orientation, configuration movement and operation of such coverings. Similarly, owners and operators often desire to control the positioning, configuration, movement, orientation and/or operation of other movable devices, such as windows, doors, air dampers, vent fans and the like (collectively “blinds”). Commonly, the control of blinds has been accomplished by a person manually adjusting the blind or when powered by a motor or the like by using a user interface which, upon depressing a button, assists in the positioning and/or operation of the blind. Often more than one button is used to control the orientation and position of the blind.

Further, many blinds today utilize a single set of controls for both the position and orientation of the blind. Such blinds commonly adjust the orientation of the blind (i.e., titling the vanes of the blind) using a low torque is applied to a rotary control mechanism, while a high torque often used to control the positioning of the blind (i.e., raising and lowering the vanes of the blind).

Additionally, due to various factors (both human and environmental) automated blind systems currently available often suffer from “drift”, wherein the determination of the desired stopping locations at the top, bottom and otherwise for the blind undesirably vary. Also, blind systems today are often inefficient with regards to power due to constant “on” states and the like. Therefore, existing control systems are often undesirable and unworkable for many blinds. A need exists for an automated control system for blinds which solves these and many other needs.

SUMMARY

The various embodiments of the present invention relate to systems and methods for controlling the positioning and orientation of blinds (i.e., window coverings, windows, doors, dampers and other apparatus capable of being controlled with regards to configuration and/or orientation).

In one embodiment, a system is provided for controlling at least one of the position and orientation of a blind. The system includes a controller for operating a blind, at least one detector operably connected to the controller for simultaneously detecting position and orientation of at least one element of the blind, and at least one output device operably connected to the controller for controlling at least one of the orientation and position of the blind. Further, the controller can include a receiver program module which includes at least one computer executable instruction utilized to decode received instructions. In another embodiment, the system can also include a device controller module which has at least one computer executable instruction utilized to control the operation of the at least one output device. In yet another embodiment, a detector program module is included and has at least one computer executable instruction utilized to control and process information received from the at least the one detector. Further, the system can include a timer program module having at least one computer executable instruction utilized to control the frequency at which a detection signal is requested from the at least one detector by the controller.

In one specific embodiment of the present invention, a compatible system can also be configured to generate frequency detection signal requests approximately once every five milliseconds. Further, such requests can relate to a desired rotational speed of an actuator used to reposition and/or reorient a blind.

Further, the various embodiments of the present invention may be configured to include a controller which has executes a system controller program module whereby at least one computer executable instruction utilized in routing inputs to and outputs from at least one of a receiver program module, device controller module, and timer program module. The system controller program module may further include a watch-dog timer.

The various embodiments of the present invention may also be configured to be compatible with instructions set in various portions of the electromagnetic spectrum. In particular, the system can include a receiver having a receiver program module compatible with receiving and decoding instructions communicated in at least one of an infra-red and a radio frequency signal. The system may also include a remote control device utilized to communicate at least one of a position and an orientation instruction to the controller.

The various embodiments of the present invention may also be utilized with a wide variety of devices, whose position and orientation may need to be controlled. In one exemplary embodiment, such a device can be a blind which can include a header, a plurality of horizontal vanes extending from the header, a shaft, at least one guide wire operably connecting the plurality of horizontal vanes to the shaft, and a power motor operably connected to the shaft. The blind can also include a detector, operably connected to the shaft, for determining at least one of the rate and direction of rotation of the shaft. Further, in a particular embodiment, the detector can have a rotary interrupter and an opto-coupler which collectively detect movement of the shaft and generate output signals indicative of the same for communication to the controller. More specifically, the output signals may include at least one of a polarity signal, run signal, and speed signal.

In yet another embodiment of the present invention, an apparatus is provided for controlling the position of a blind. The apparatus can have a controller, and a computer readable medium, operably connected to the controller, further having: a detector program module which utilizes signals provided by a detector to determine at least one of the position, direction and rate of movement of shaft from which a plurality of vanes extend and communicates at least one detector output signal indicative thereof; a receiver program module, which decodes received operating instructions, and outputs a decoded signals; and a device controller module which receives and utilizes the at least one detector output signal and the decoded signal to control the operation of at least one actuator, wherein the at least one actuator facilitates the rotation of the shaft. Further, in another embodiment of the present invention, an apparatus is provided wherein the computer readable medium has a timer program module which outputs signals indicating the frequency at which a detector outputs signals is utilized by the detector program module; wherein the timer program module manages power consumed by the apparatus. Additionally, the timer program module can be configured to include at least one computer executable instruction that instructs the controller to manage power consumed by the apparatus by periodically configuring at least one input device or output device into standby mode.

The various embodiments of the present invention may also be configured to execute various methods and processes. In particular, one embodiment includes a method for controlling at least one of the position, movement and orientation of a blind. This method may be implemented, for example, by: receiving an input signal from a detector, the detector comprising an opto-coupler and a rotary interrupt, specifying an initial position of at least one element of a blind; receiving an operating instruction from at least one user interface; determining when a hard stop event will occur; and controlling a position of the blind based on at least one of the detector input signal, the received operating instruction, and the hard stop event determination. Further, in other embodiments, the present invention may implemented processes and methods that further include the operations of determining a range of positions based on the initial position indicated by the at least one detector; and determining the speed and movement of the blind with the at least one detector.

In yet another embodiment of the present invention, a method of using the same can include the operations of changing a status of a blind position based on the hard stop event determination; recalling a stored blind position; and calculating a number of positions to be traversed by the blind based on the stored blind position and a new instruction containing desired blind parameters. More specifically, one embodiment may execute the operations of controlling a velocity and torque of the blind to avoid hard stops; and controlling blind movement by periodically querying a detector. Further, the foregoing and other methods and operations can be configured to calculate the number of positions traversed by a blind by periodically querying the detector, wherein the detector comprises a rotary interrupter having a predetermined number of teeth and gaps adjacent to an opto-coupler configured to translate the number of teeth and gaps into one or more communication signals based on the passing of teeth and gaps through an optical beam generated by the opto-coupler. In yet another embodiment of the present invention, a method is provided whereby the preceding operations may further include associating the translated number of teeth and gaps detected within a given time period to determine continuous motion of the blind within the predetermined sampling rate; and determining a change of status of a blind position based on an absence of changes in teeth and gaps to further determine whether a hard stop is reached. Additionally, such methods can further include recalling a stored blind position, determining a range of positions relative to the desired blind parameters, whereby a destination position is determined, and controlling the velocity and torque of a motor used to rotate the shaft based on a relative distance to the destination position.

The foregoing are merely exemplary examples of the various systems, apparatus, processes, methods, computer readable mediums, propagated signals, computer data structures and other embodiments of the present invention. The scope of the present invention is not limited to such exemplary embodiments and other embodiments described herein or commonly appreciated as in accordance with the following detailed description, the drawing figures, and claims.

DESCRIPTION OF THE DRAWING FIGURES

DETAILED DESCRIPTION

An apparatus, software and method is provided for controlling the operation of a powered and movable device. In one particular embodiment, the present invention includes software, which may be provided as an article of manufacture, a propagated signal, embedded within the apparatus or otherwise, for use in controlling the velocity and torque, as well as the positioning and orientation, of a powered window covering, such as a shade, blind, awning, or other devices. In other embodiments of the present invention, other devices may be controlled by use of the present invention, such devices may include, but are not limited to, the positioning or of windows or doors (e.g., up/down or open/close) and other apparatus whose position and/or orientation may be automatically controlled.

Figure 1:
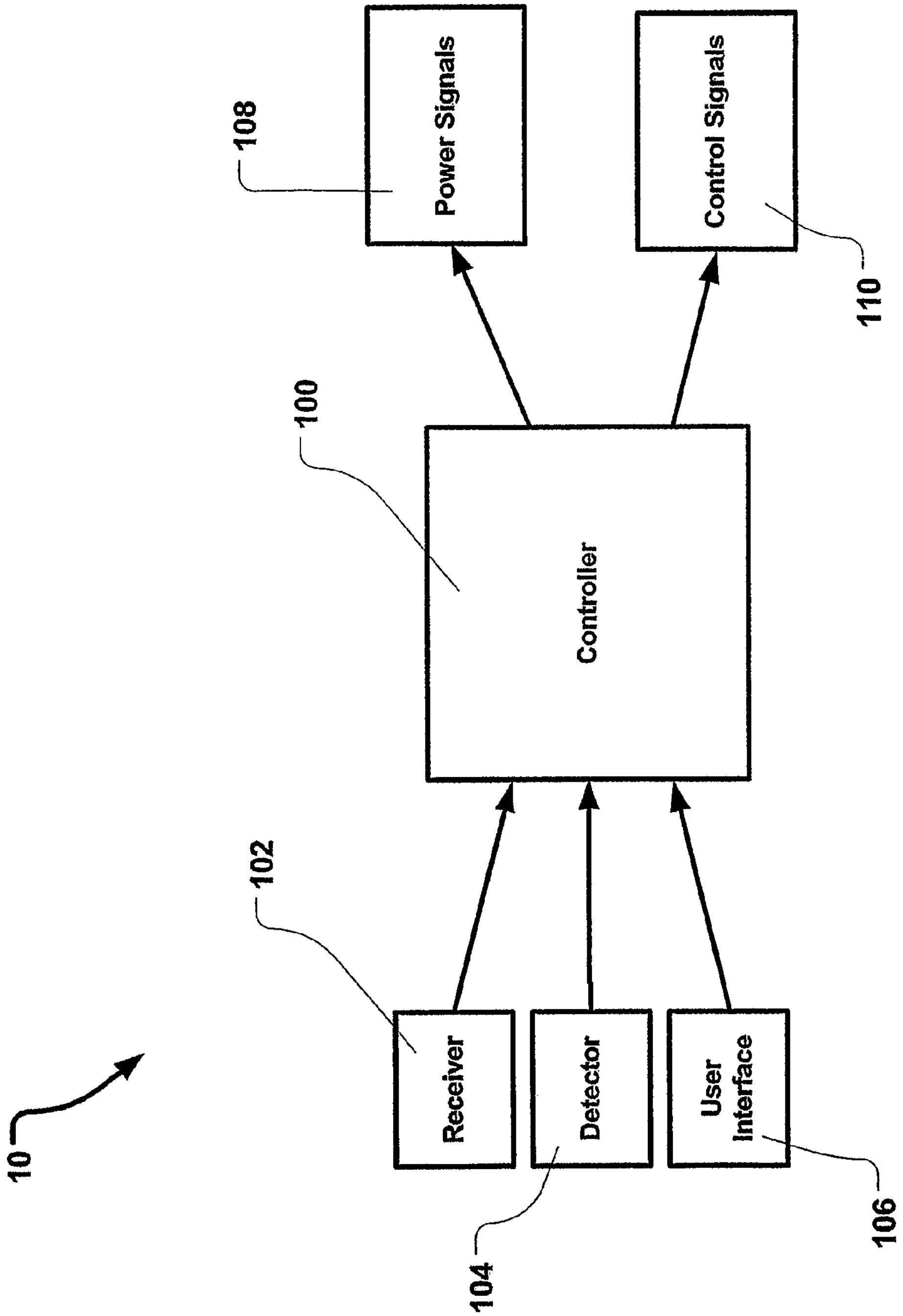
FIG. 1 is a schematic representation of a system for use in implementing one embodiment of the present invention.

In one embodiment of the present invention an apparatus 10 is provided for controlling the position of a blind. As shown in FIG. 1, this apparatus 10 includes a controller 100 which is connected to a plurality of input devices and a plurality of output devices. Examples of such input devices include one or more receivers 102 of electromagnetic signals, one or more detectors 104 and one or more user interfaces 106. Examples of output signals provided by the apparatus for use in controlling devices, such as motors and actuators, include power signals 108 and control signals 110. A system implementing an embodiment of the present invention may also be considered to include the apparatus 10 as well as the corresponding devices which generate the signals received by the input devices and/or the devices which utilize the output signals to control a blind or other device. Also, it is to be appreciated that the controller 100, based upon input signals received from one or more receivers 102, detectors, 104 and/or from a user (for example, via a user interface 106) utilizes certain control programs, software routines and algorithms to generate the one or more power signals 108 and control signals 110 used in controlling and operating a device in conjunction with the present invention.

More specifically, one embodiment of the present invention utilizes a controller 100 which is configured as a microcontroller. One example of such a microcontroller is a PIC16F627 microcontroller manufactured by MicroChip Technology located in Phoenix, Ariz. It is to be appreciated, however, that other microcontrollers may be suitably utilized in conjunction with the various embodiments of the present invention. Similarly, microprocessors and/or other programmable or programmed control devices may also be utilized. Such controllers may be located proximate or remote to any given blind(s). When remote, any of the well known networking architectures may be utilized to facilitate the communication of inputs and outputs from/to the blind and to/from the controller. Thus, the controller 100 is not limited to any particular devices or configuration of devices and may include microcontrollers, microprocessors, and otherwise. The operation of the controller 100, for at least one embodiment of the present invention is discussed in greater detail below.

The apparatus shown in FIG. 1 also desirably includes one or more receivers 102. Such receivers are suitably connected to the controller 100, whether by hard-wire, wireless, networked, or otherwise. While the connection is shown in FIG. 1 to be unidirectional, it is to be appreciated that bi-directional communications between the receiver 102 and the controller 100 and/or with other components of the apparatus 10 (whether shown or not shown in FIG. 1) may also be provided. Such bi-directional communications may be utilized for any of a variety of commonly known reasons including, but not limited to, diagnostics, status monitoring, power, control and the like.

In one particular embodiment of the present invention, the receiver 102 includes an Infra-Red ("IR") signal receiver which is configured to receive IR signals from one or more remote control units. The IR signal receiver interprets received IR signals and outputs control signals, to the controller, representative of the information contained in the received IR signal(s). While signals from a remote control unit are desirably communicated, in the present embodiment, using the IR portion of the electro-magnetic spectrum, it is to be appreciated that other portions of the spectrum may be suitably utilized as particular implementations of the present invention require. For example, in implementations wherein line-of-sight communications between a remote control unit and the receiver 102 are not possible, radio frequency signals may be used. Any of the numerous communication protocols currently, or in the future, available may be utilized including, but not limited to, Bluetooth, IEEE 1394, WiFi, WLAN, CDMA, TDMA, and GSM. The present invention is not limited to using any one (or many) of such communication protocols when facilitating communications between the apparatus and any number of internal and/or external sensors, devices or actuators.

Further, the remote control units may be configured to support multiple communication frequencies. Desirably, switches are provided on the controller and the remote control devices to support a plurality of communication channels. The remote control units may also support any range of control functions from simple to advanced functions. For example, simple functions may include basic keypad operations. Advanced functions may include touch screens, voice activation and the like. The remote control unit may also be configured for use in controlling multiple devices and/or multiple controllers.

The receiver 102 may also be configured to include one or more "external" IR signal receivers. In the context of the present invention "external" is utilized herein to refer to a device which is not dedicated to a particular blind, examples of "external" IR signal generators may include motion detectors, wind, rain, sun detectors, and the like. Also, "external" IR detectors may include those external to any given blind that are utilized to detect the location of a portion of a blind (such as one or more vanes) at any given time. Further, "external" IR sources may also include remote control devices and non-dedicated remote control units that may be used in the controlling of one or more blinds. Again, while one embodiment of the present invention utilizes a receiver configured to receive IR signals, it is to be appreciated that other embodiments may receive other forms of electromagnetic signals, including, but not limited to, those previously mentioned hereinabove.

Figure 6:
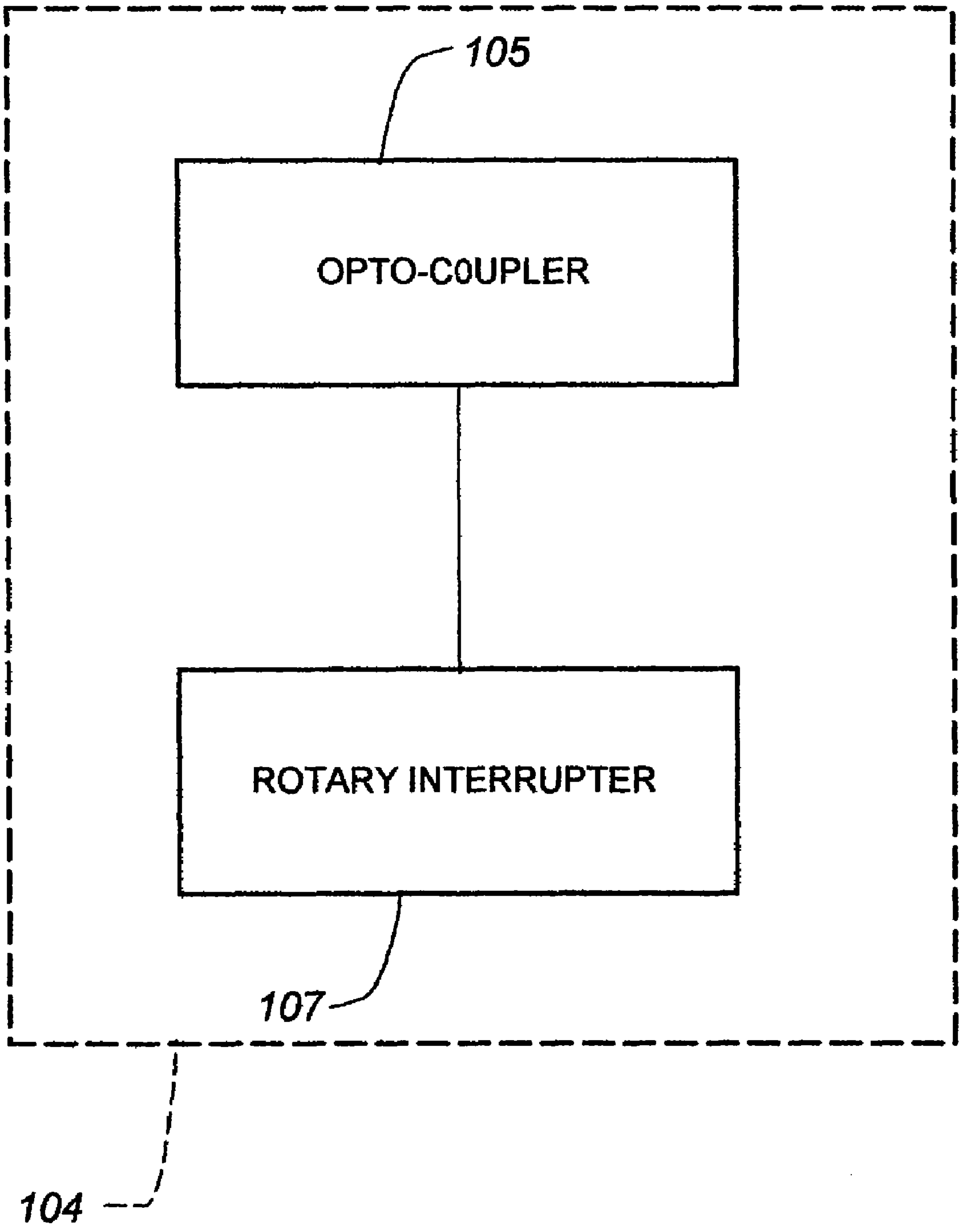
FIG. 6 is a block diagram of one embodiment of the detector, including an opto-coupler and a rotary interrupter.

The various embodiments of the present invention in general, and the apparatus 10 shown in FIG. 1 in particular, may also be configured to include one or more detectors 104. Desirably, such detectors 104 are hard-wired to the controller 100, but wireless and/or networked configurations may also be utilized. In one embodiment of the present invention the detector 104 includes an opto-coupler 105, which in combination with a rotary interrupter 107 (See FIG. 6), detects movement of a blind. In another embodiment, the detector 104 utilizes optically encoded signals to determine the position and/or rate of movement of a blind, wherein a blind commonly has a fixed first element, and one or more second elements connected (directly or indirectly) to the first element and with respect to which the second element(s) (i.e., one, all or many) extend(s) to varying heights and/or in varying directions (i.e., horizontally, vertically and diagonally) and may be suitably controlled to varying heights and/or in varying directions. In other embodiments, non-optical signal detectors may be used including positional signals generated using transducers, potentiometers, duty cycles or other reading of on/off times for a motor, magnetic signals, a plurality of optical detectors (such as those used in an array or linear sequence), and other detection technologies. Detectors may be utilized which to hard-stop locations (or other locations of a blind with respect to a given reference location). Also, the direction and/or speed of movement of one or more blinds and other metrics may also be detected. For at least one embodiment of the present invention, detectors may be utilized which merely determine the movement of a blind. Similarly, multiple detectors (such as two or more opto-couplers) may be utilized to determine both movement and direction of movement of a blind.

Figure 2:
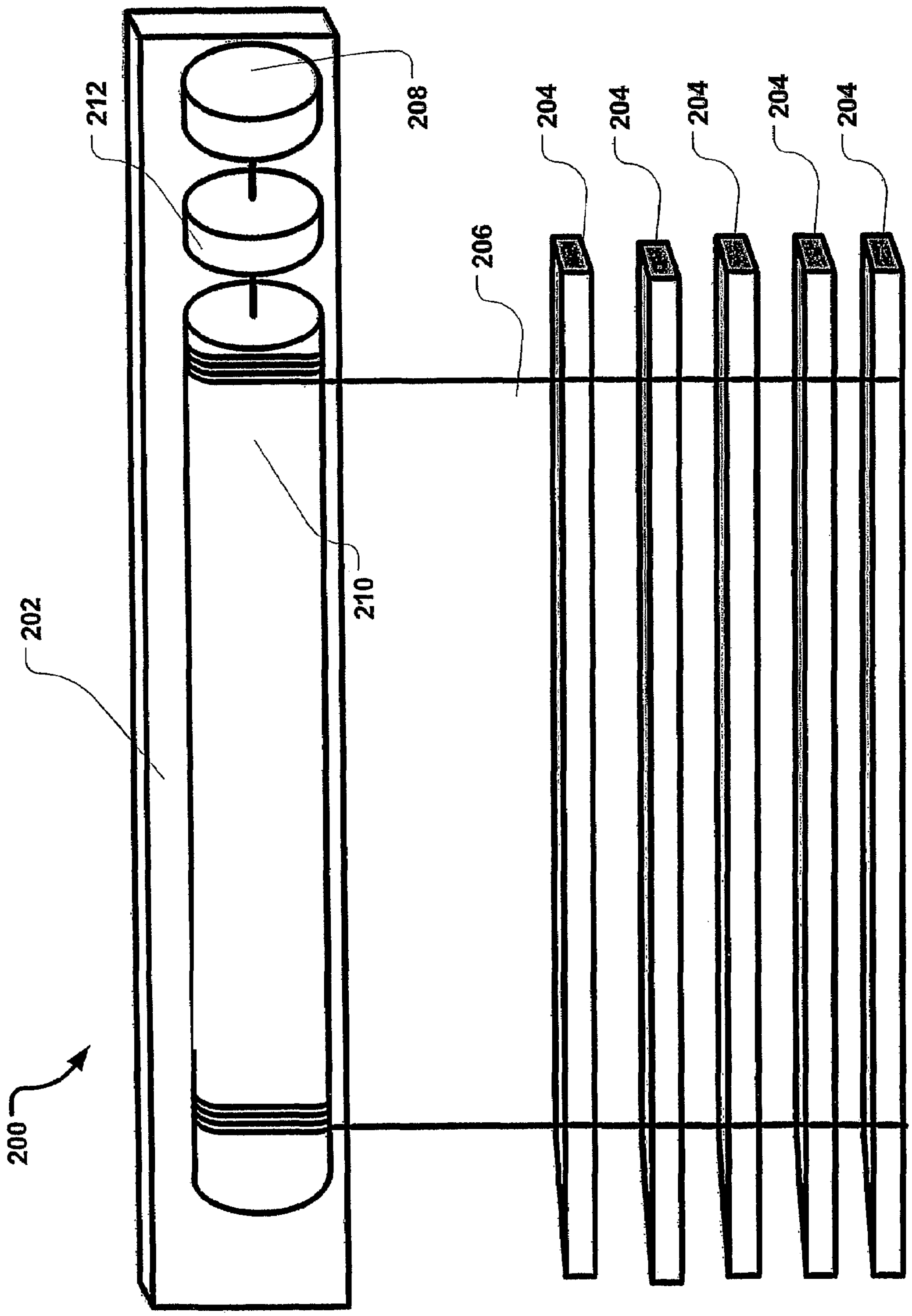
FIG. 2 is an illustrative representation of one embodiment of a "blind" utilized in conjunction with a first embodiment of the present invention.

For example, as shown in FIG. 2, a blind 200 consisting of a window shade may have a header 202 (the first element) and a plurality of horizontal vanes 204 (the second elements) which extend from the first element, commonly in a downward direction. One or many of the vanes 204 are raised or lowered, for example, by reeling in or out, respectively, guide wires 206, or using a powered motor 208. Desirably, the detector 212 detects the rate of movement of the guide wires, and the corresponding movement of the vanes 204, via the rotational movement of the shaft 210. As the shaft 210 rotates, a second detector 212' (not shown in FIG. 2), may also be affixed relative thereto, to facilitate the detection of the rotational direction of the shaft 210 as it moves. Thus, the detector(s) 212 generate signals, for communication to the controller, indicative of the direction of movement and, in certain embodiments, the rate of movement of one or more blind components (e.g., vanes). Multiple motors, shafts and/or guide wires and/or other components may be utilized to control the position and orientation of a blind and its members (e.g., vanes, drapes, shafts, guide wires, and the like). Also, the shaft may be referred to as a roller, drum, rotator wheel or otherwise. Similarly, the detector(s) may be suitably located on or relative to such blinds to detect the movement and position of blind members. In at least one embodiment, limit switches are not utilized to detect the movement and/or position of a blind member at any given time. Instead, a single detector is utilized to detect hard-stops (i.e., positions at which the blind can no longer continue in a given direction) based upon momentary interruptions in shaft rotation that occur when a hard stop location is reached.

In certain embodiments, the position of a blind's members may be influenced by external factors such as wind, manual adjustments and the like. Desirably, the detector is configured to detect relative positional changes of blind members so that signals representative of position changes (within any given desired range) of blind member(s) (one or more) may be provided to the controller.

Referring again to FIG. 1, a user interface 106 is also included. The user interface may be hard-wire connected to the controller 100 and/or may be connected wirelessly or via one or more networks or otherwise. The user interface 106 includes any desired combination of user output devices (for example a liquid crystal display and a speaker), and user input devices, for example, buttons, keypads, touch sensitive pads, hand-writing interpretation devices (e.g., those used on certain personal data assistants), voice command devices, scroll wheels, control pads and the like. It is to be appreciated that various combinations of input and output devices may be provided in the user interface to facilitate the providing of instructions and information from a user to the controller and/or the providing of status or other information from the controller to the user interface. FIG. 1 shows for this particular embodiment a uni-directional communications link existing between the user interface 106 and the controller 100. Bi-directional communications may be supported in certain embodiments. Similarly, the user interface 106 may be configured to be provided in and/or compatible with a wide variety of electronic devices including, but not limited to, audio/visual remotes, whole house/office/building automation systems, cellular telecommunication devices, personal data assistants, personal computers, lap top computers, networked computing devices, alarm systems, fire control systems, and others.

As discussed in greater detail below, upon receiving inputs from the receiver 102, detector 104 and/or user interface 106, the controller 100 generates one or more output signals utilized in controlling the operation of one or more blinds. Output signals may be provided to sensing or input devices utilized in conjunction with various embodiment of the present invention, such as detectors, IR receivers, remote control units, user interfaces, and others. Output signals may also be provided to various motors or actuator devices (e.g., braking mechanisms). Output signals may be provided in various signal formats over wired and/or wireless communications links. "Smart" devices (i.e., devices containing one or more decoders or signal processors and capable of receiving a communications signal and extracting information from such signal and using the information to control one or more actuators or devices in one or more blinds) may be utilized. Also, the output signals may be communicated using IEEE 1394, TCP/IP, CDMA, and/or other formats. Similarly, relatively "dumb" devices may be used to facilitate the control of blinds. When such "dumb" devices are utilized, the output signals are generally communicated using direct serial or parallel communications. Further, various combinations of "smart," "dumb" and in-between devices may be utilized in conjunction with the various embodiments of the present invention.

In one embodiment, the controller 100 outputs control signals in the form of motor control signals. Such motor control signals include polarity signals (i.e., whether to rotate the shaft clockwise or counter-clockwise) and run signals (i.e., whether to turn the motor on/off). When utilized in conjunction with the exemplary embodiment shown in FIG. 2, it is appreciated that by pulsing the on/off signals for a DC motor, the relative speed at which a blind rises or falls may be controlled. Further, by pulsing the motor at a higher rate during certain portions of travel and at a slower rate as a desired blind position is approached (for example a hard upper limit or lower limit) the rate of movement of the blind (up/down) and also the torque generated by the motor may be controlled.

Similarly, in an AC motor embodiment (i.e., where an AC motor is used to control one or more positional aspects of a blind), the controller 100 may provide control signals to a variable frequency power supply or similar device which varies the current the AC motor receives and/or the polarity of such current in order to drive a shaft in a given direction at a given rotational speed. Again, variable control may be provided by increasing or decreasing the frequency of the output current.

Also, the controller 100 may be configured to output and/or relay control signals for more than one blind. In a group blind configuration, wherein a plurality of blinds exist that are desirably controlled using a single controller (for example, in an office building), the controller may be configured to generate multiple control signals (and receive multiple input signals). Each of these control signals may provide the same information to all devices, groups of devices and/or individual devices being controlled by the controller. Further, multiple controllers may be networked together, using commonly known networking techniques, to facilitate the control of multiple devices over any distance.

Figure 3:
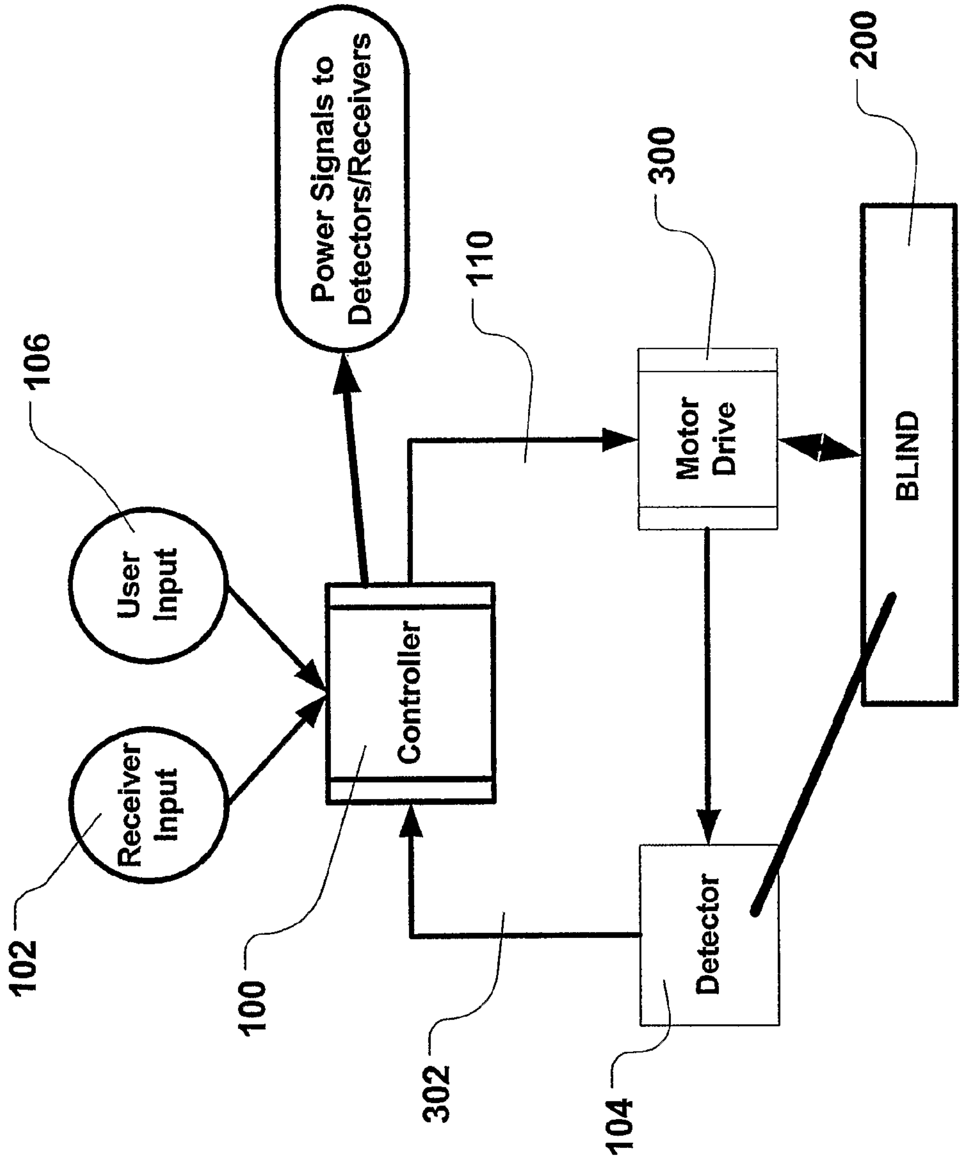
FIG. 3 is a schematic representation of a control system used in various embodiments of the present invention.

Referring now to FIG. 3, the various components of the apparatus 10 described above, for at least one particular embodiment of the present invention, desirably operate together to provide a closed loop control system for the operation of one or more blinds. As shown, the controller 100 provides control signals to a motor drive device 300 which accordingly drives the blind in the desired manner (i.e., up/down, left/right, open/close and the like). Also, at least one detector 104 monitors the rotation of the shaft and provides feed back signals 302 to the controller 100 representative thereof. For example, when a detector is positioned relative to a shaft used to raise/lower the blind, the detector outputs signals representative of the rate at which the shaft is being rotated, which correlates to the rate at which the blind is being raised/lowered. In other embodiments, additional detectors may be utilized to detect the direction of movement of the blind.

Also, FIG. 3 shows that the controller 100 generates the control signals based upon instructions received from a user, via a user interface, or other receiver 102 (e.g., via a remote control device, or a wind or sun sensor). Such instructions may include, for example, "raise blind halfway," "raise blind entirely," "lower blind" and others.

To assist the controller in monitoring and controlling the position of one or more blinds, instructions are provided to the controller in the form of one or more software program routines. In one embodiment, these program routines are embedded into the controller, for example, in read only memory or otherwise. In other embodiments, the software program routines may be provided to the controller using any of the numerous available technologies, such as memory devices (e.g., Random Access Memory), via one or more computer readable mediums, such as optical mediums, (e.g., CDROMS, DVD-ROMs), magnetic mediums (e.g., floppy disks), electronic mediums (e.g., Flash memory cards, SD cards and the like), propagated signals (e.g., those sent over a communications medium or network, for example, the Internet or a LAN), and any other medium for providing software programs data and/or instructions to a control device.

Figure 5:
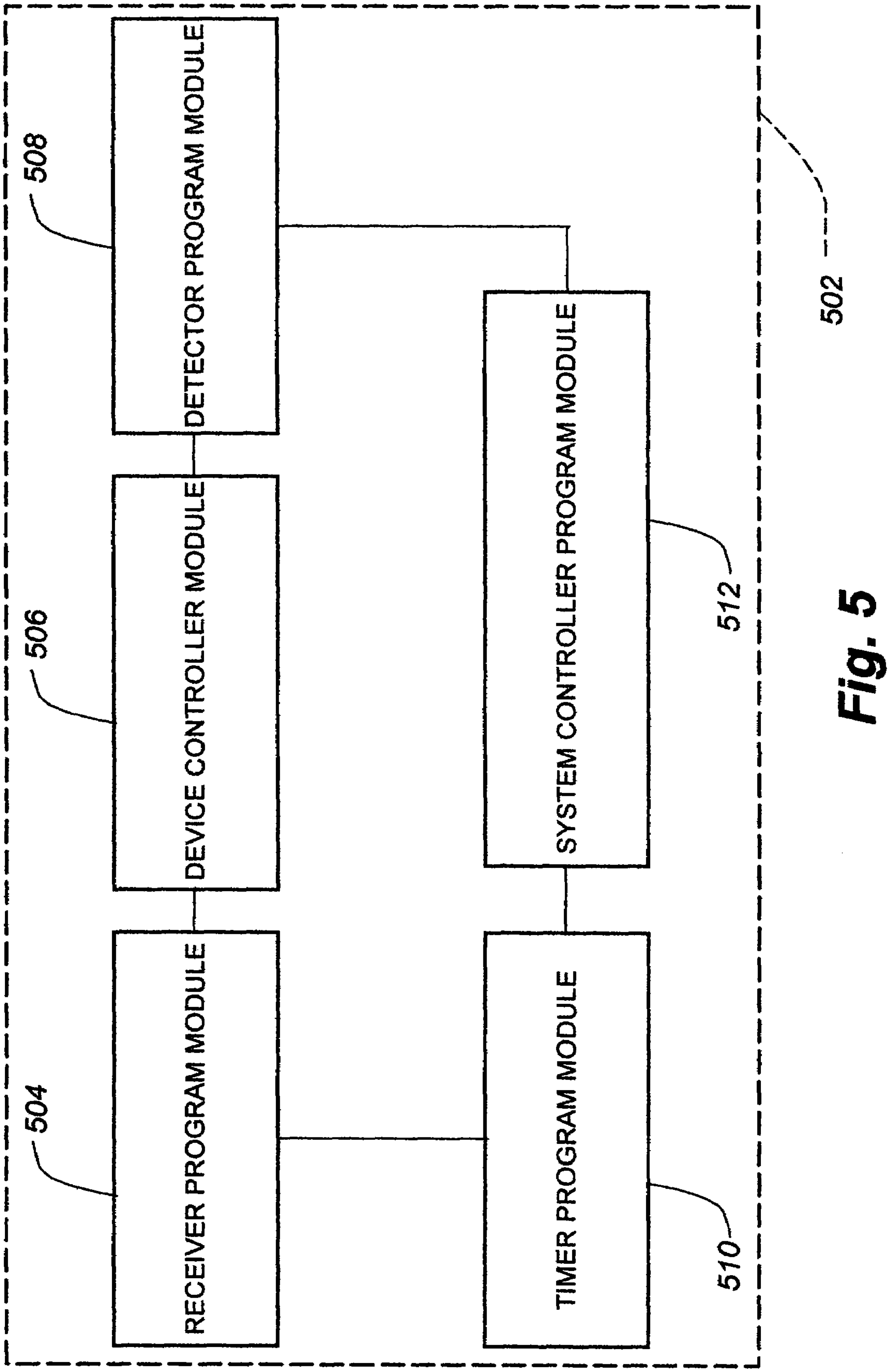
FIG. 5 is a block diagram of one embodiment of a software program associated with the present invention.

For one embodiment as shown if FIG. 5, the software programs 502 includes at least five modules: a receiver program module 504, a device controller module 506, a detector program module 508, a timer program module 510, and a system controller program module 512. Other and/or fewer program modules may also be provided, as desired, in various embodiments of the present invention.

Regarding the receiver program module, this program module desirably provides the instructions and routines necessary to receive and extract commands from IR (or other electromagnetic) signals. The reception, decoding and extraction of commands from IR signals is well known in the art, any of such reception modules may be utilized in the various embodiments of the present invention. Also, it is to be appreciated, that the receiver module may be accessed directly by the controller, or in other embodiments, by the receiver 102 or otherwise. In any event, the various embodiments of the present invention provide various computer program instructions and/or routines which facilitate the reception and decoding of electromagnetically encoded commands.

The device controller module provides those computer program instructions and routines utilized directly or indirectly by the controller to control the operation of one or more actuators (e.g., motors, brakes, and the like). Desirably, these program routines provide for the up/down, left/right, tilt/un-tilt, rotate/un-rotate and other operation of any given blind. Also, motor speed and torque control is desirably provided in these program instructions and routines. Such motor and torque control desirably are utilized while moving vanes to prevent the vanes from reaching hard stops at undesirable speeds and thereby possibly damaging the blind(s). Motor and torque control may also be utilized to minimize and/or prevent the occurrence of undesired operating conditions, such as the generation of excessive noises, the wasting of energy and the like. Also, these program routines may be utilized to control the operation of the blinds so as to minimize power consumption, especially in battery powered units.

The detector program module is utilized to control and process information received from the one or more detectors utilized in any given implementation of the present invention. In particular, this program module includes a blind position sensor routine, which accepts inputs from, for example, an encoder and utilizes such inputs to determine the position of the vanes at any given time. Other inputs, may also be used by this module, including hard stop sensor and rate sensors.

A timer program module may also be included in various embodiments of the present invention. In one embodiment, the timer program module operates a 1 MHz clock which facilitates the controller performing at least one million instructions per second, as necessary. However, in one embodiment, the timer program module provides instructions to the controller to seek an input from a detector once every five milliseconds, thereby supporting a maximum rotational speed of a shaft of two revolutions per second. It is to be appreciated, however, that greater or lesser maximum shaft speeds may be used with corresponding increases or decreases in sampling rates, as influenced by timing intervals and other parameters.

Further, the timer program module provides for power management functions such as powering on/off various components during predetermined "lull" periods (e.g., from 10 p.m. to 6 a.m. there commonly is no need to change the configuration of vanes). Also, this program module may be configured to turn on/off, place in "standby" and similarly assist the controller in configuring blind components after lapses of operations for a given time period. Desirably, the controller spends most of its time in "sleep mode." When the controller is not processing an instruction, the timer program module assists the controller in minimizing energy consumption for the better part of every second, by entering "sleep" mode, during which time, sensors, detectors, actuators and other devices are powered-off. For example, if no user inputs are received within a given quantity of time (i.e., "T:" minutes, wherein "T" may be defined based upon particular implementation) of a previous user input, the controller may "assume" the user is finished with inputting commands, and may power-down certain components (such as the decoder, keypad, illuminating lights and the like).

The system controller program module provide controller management functions which interpret incoming signals and forwards such signals to the appropriate program module. The system controller program module is also responsible for overall operation of the blinds and may include common functions such as watch-dog timers, interrupts, fault monitors, and others.

Each and/or any of these program modules may be separately, in groups, collectively provided, incorporated in, or used by any of the elements of the invention. For example, a receiver program module may be provided as an "IR decoder module" when IR signals are utilized in a particular embodiment of the present invention. Similarly, an "RF decoder module" may be used when RF signals are used. Thus, multiple instantiations of program modules may be utilized in the various embodiments of the present invention.

Figure 4:
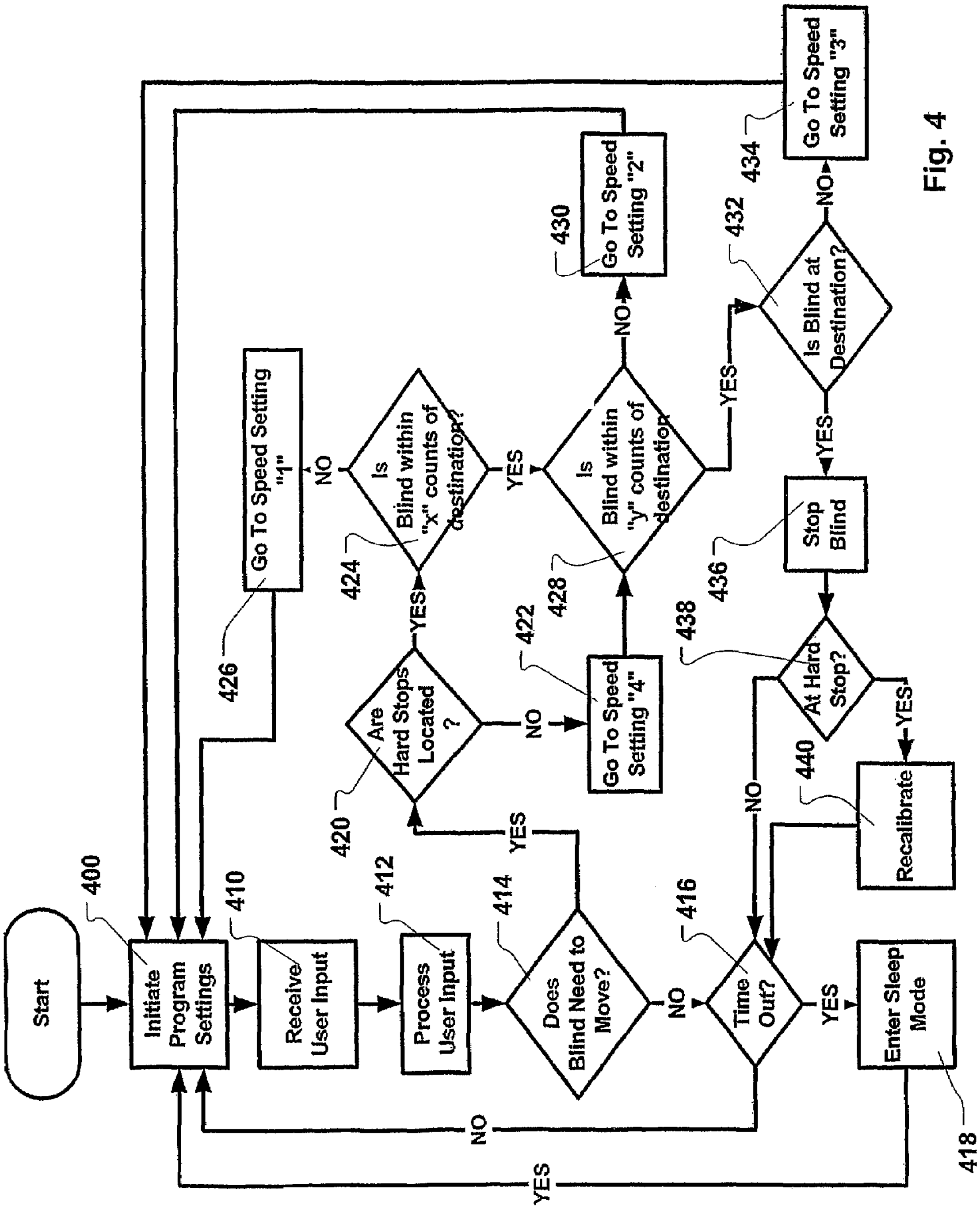
FIG. 4 is a flow diagram representing one embodiment of a process utilized in one embodiment of the present invention to control the positioning and orientation of one or more blinds.

As shown in FIG. 4, one embodiment of a method by which the various elements and program modules operate to control the operation a blind is shown. It is to be appreciated, however, that other embodiments, which use some, all or different elements and/or program modules may be utilized in conjunction with the teachings of the present invention. In particular, the embodiment shown in FIG. 4 begins with an initialization of the controller to receive program inputs (Operation 400). During initialization, various devices may be initiated including the detector, motor and others. Also, various parameters are recalled such as hard stop locations (e.g., top and bottom locations). In one embodiment, a top position is desirably indicated by a detector reading of zero (0) while a full down position is indicated by a reading of 1000 (however, other ranges may be used as desired and/or required by the length of any given blind). In one embodiment, every detector count equates to a movement of the blind one-tenth of an inch (i.e., the encoder is calibrated at ten counts per inch). It is to be appreciated that greater or lesser specificity may be provided when detecting blind movements; such specificity resulting in a corresponding greater or lesser precision in blind placement. However, as drift occurs, a full top position may result in a detector reading of "a" while a full down position may result in a detector reading of "b." The various embodiments of the present invention accommodate such drift by recalibrating top/down positions each time a corresponding hard stop location is reached, as determined based upon readings from one or more sensors.

If the blinds are not located at a top or bottom position, then detector data readings previously recorded and saved are utilized for subsequent operations. Also, during this time queries are made, by the controller, to the status of one or more flags. One status flag, an interrupt flag, provides an indication of whether a hard stop has been reached during movement, if any, of the blind. In particular, the detector is desirably configured to indicate a hard stop location based upon the lapsing of a predetermined period of time between successive detector pulses.

More specifically, in one embodiment, the detector includes an opto-coupler and a rotary interrupter having 30 teeth and 30 gaps. Each time the shaft rotates, a corresponding number of teeth and gaps pass by the opto-coupler, thereby creating an output pulse varying between a high and a low state. Every 5 milliseconds the controller queries the detector for a change in status (i.e., a transition from a high to a low state or a low to a high state, as indicated by corresponding pulses or gaps), thereby indicating continuous movement of the blind. When a hard stop is reached, such as at a top or a bottom location, a change of status (i.e., a progression from a high to a low or a low to a high state) does not occur within the given sampling time. This change of status represents a hard stop. For at least one embodiment, the controller queries the detector for output 200 times per second while the rotary interrupter disrupts the opto-coupler's signal 60 times per revolution, or at two revolutions per seconds. A status change occurs (when the blind is moving between hard stop locations) 120 times per second. However, it is to be appreciated that different sampling rates may be used in other embodiments of the present invention as determined based upon the maximum rotational speed of the shaft, processing speeds of the controller and/or other parameters.

In operation 410, the process (for at least one embodiment) continues with determining whether a new input instruction has been received. It is to be appreciated that a new input instruction may be received, for example, from a sensor, a user interface, a remote control unit, a program module (for example, a module instructing certain operations to occur based upon time of day) or the like. If a new input instruction has been received, the method continues with implementing the received instruction (Operation 412). If a new input is not received the method simply continues with executing any previously provided user instructions (if any).

When an input instruction is received, the controller suitably stores the parameters related to the instruction for use while controlling the movement of the blind. For example, an instruction may entail adjusting the blinds incrementally, such as while a user depresses an up or down position. In such instance, each pressing of the remote button may be configured to correspond to a given number of detector counts, which are representative of the blind moving in either a positive (up or left) or negative direction (down or right), respective to a given blind orientation). Similarly, a holding of a button may result in a repeated number of detector counts being communicated from a remote to the controller. When such detector counts are combined with a current (positive or negative) being provided to a motor, the direction and speed of movement of the blind may be determined. Also, when a button is held for a given amount of time, such repeated hold may signal to the controller to utilize one or any number of possible motor speeds to move the blinds. Thus, it is to be appreciated that the various program modules may be configured to provide for any desired range of control of blind movement. Input instructions may also be configured for hard limit (e.g., full open or full closed) or soft limit operations (half-open, three quarters open, or the like).

Desirably, the controller also recalls from memory the current blind position which is used in determining how many detector counts are necessary to configure the blind as desired while also determining operating parameters for the given operation. More specifically, the various embodiments of the present invention may be configured to continuously control the velocity and torque upon the blinds such that hard stops are avoided and power use is conserved. It is to be appreciated that initiating the movement of a blind from a resting position to an "in-motion" condition utilizes more torque than continuing the "in-motion" condition. Similarly, actively slowing a blind down requires more torque than letting a blind passively slow to a stop based under the influence of gravitational, frictional and/or other forces. The controller adapts for such changing performance parameters based upon the input instructions received. For example, a blind responding to a security alarm, such that the blinds are all fully open for easy police surveillance, may respond by rapidly moving the blinds from a closed (or other position) to a full open position, while using the motor to rapidly accelerate and decelerate blind movement as a hard stop is approached. In contrast, when the instructions involve the closing of the blinds due to solar effects, such movements may be very gradual (e.g., as the sun passes through the sky), the blinds may be gradually opened/closed such that the incident light upon a room remains substantially the same. The present invention accommodates such rapid, gradual or other blind movements by utilizing the closed loop system to monitor and continuously control blind position and configuration.

User instructions may also include non-movement of blind operations such as battery checks, IR checks, vane controls (when vanes are provided in a blind) and others. As such, in Operation 414 a determination is made as to whether the user input instruction requires the movement of the blind. If not, then the method continues with determining whether a time-out condition has not occurred (Operation 416). More specifically, in order to minimize energy consumption, at least one embodiment of the present invention configures the sensors, devices, detectors and other components in an active state (when blind movement is not required) for a limited given amount of time. In one embodiment, such "active" time is 0.5 seconds long. Thus, when a time-out has not occurred, the controller continues processing with Operations 400-416 (i.e., the main control loop) until either a blind movement instruction is received, or a time-out condition arises. If a time-out condition occurs (Operation 416), the main loop enters "sleep mode" for desirably 0.5 seconds (Operation 418). However, in other embodiments, longer and/or shorter, if any, sleep times may be utilized. Further, it is to be appreciated that for line powered (versus battery powered) blinds, sleep mode may not be utilized at all.

Referring again to Operation 414, when an instruction is received that dictates movement of the blind, the method continues with determining whether the hard stops have been located (Operation 420). In certain embodiments, the location of hard-stops may not be maintained from one "active" state to another or from an "on" state to an "off" state. As such, in order to prevent damage to the blind, upon returning from an unknown condition (i.e., a condition wherein the count value for a hard stop may not be known, or the present location of the blind may not be known relative to such hard stops), the controller operates the blind in a safe mode and desirably at a low speed and low torque (i.e., speed setting "4") (Operation 422). It is to be noted, however, that speed settings "1," "2," "3," and "4" are used herein for illustrative purposes only and are not to be considered as corresponding to any particular speed/torque setting. As such, speed setting "1" may be greater, lesser or equal to speed settings "2-4" (and so forth) for various embodiments of the present invention.

If the hard stop locations are known, then various parameters for the movement of the blind and the position of the blind relative to one or more destination set points are determined. For example, the method continues with determining whether the blind is within a given distance "x" of a desired destination (Operation 424).

More specifically, once an instruction is received, the controller monitors the location of the blind relative to one or more destinations (e.g., a program routine may have multiple set points throughout a day) and accordingly controls the operation of the motor(s). Further, various "speed" (and "torque" settings—not shown in FIG. 4) may be used to control blind operation. For example, "speed" setting "1" may be a low speed/high torque setting which facilitates the movement of the blind from a resting to a moving condition (Operation 426). FIG. 4 shows such condition (i.e., speed setting "1") existing based upon positional information relative to a given destination (as determined in one embodiment based upon encoder readings). However, it is to be appreciated that such determinations may also be made based upon cable speed or other parameters. Also, in other embodiments, speed setting "1" may be a high speed/low torque position or a high speed/high torque or a low speed/low torque position, or otherwise. Thus, the present invention may be configured to utilize a varying array of speed and torque settings at various stages of operation.

If the blind is within a given distance of a desired destination (as indicated by a number of counts), the method continues with determining whether the blind is within a second range (or "y" counts) of a destination (Operation 428). If so, then desirably speed setting "2" is used while controlling the rotational speed of the shaft (Operation 430). It is to be appreciated that speeding setting "2" may be higher or lesser speed and/or higher or lower torque than speed setting "1", as desired for a particular implementations of the present invention. Further, speed setting "2" may, for example, be a low torque/high speed setting which minimizes power use while maintaining the blind at a desired speed. Such desired speed may be predetermined or based upon other factors, such as weather conditions, security conditions or otherwise.

As further shown in FIG. 4, when the blind reaches a given number of counts of the "destination" (Operation 432), the method desirably provides for configuring the blind to move at a third (or more) speed setting(s) (Operation 434). Such speed settings facilitate the arrival of the blind at the desired configuration (e.g., full up/down and half-up) under control. In certain conditions, speed setting "3" or subsequent settings may provide for a gradual stop. In other conditions, an abrupt stop may occur. In any event, it is to be appreciated that the present invention facilitates the continuous control of blind speeds and torques. Operations 424-434 are representative of one embodiment which provides for three speed settings. Other embodiments may also be utilized as desired.

In Operation 432, a determination is also made as to whether the blind has reached the desired destination. If not, then controlled movement of the blinds continues. Again, such controlled movements may occur at speed setting "3" or others (not shown) as desired. Once the blind reaches the destination, movement of the blind stops (436). In some instance, for example, when movement of the blind is gravity assisted in a downward direction, stopping movement of the blind may require the use of reversing torques. In other embodiments, such as raising a blind, movement may be stopped by ceasing any torque being provided by a motor, applying a holding torque, engaging one or more breaking mechanisms and/or otherwise.

In Operation 438, a determination is made as to whether the blind is now at a hard stop location. If not, then the operation returns to determining whether a time-out condition has occurred, as described hereinabove (Operation 416). If the blind is at a hard stop location, then the detector data is recalibrated such that the present reading corresponds to a hard stop location (Operation 440). In this manner, the detector is desirably recalibrated every time an interrupt occurs, thereby minimizing the effects of errors, drifts or other conditions.

It is to be appreciated that using the method shown in FIG. 4 or other methods, the various embodiments of the present invention may be configured to provide for the continuous control of the speed and/or torque applied to a blind at any given time. As discussed above, variable speeds/torques may be applied. Also, the various embodiments provide for the repeated recalibration of hard stop locations, relative to a given reference (such as a number of encoder counts), thereby accommodating drift, stretching of cables (when used); wear on motors, power considerations and the like.

While the present invention has been described with respect to various apparatus, system, software program, and/or method embodiments, the present invention is not constrained to any particular combination of elements, systems methodologies or the like. The present invention may be embodied in different forms without departing from the spirit or essential characteristics described hereinabove and as claimed below.

The invention claimed is:

1. A system for controlling at least one of the position and orientation of a blind including at least one vane element comprising:

a controller for operating a blind;

at least one detector operably connected to the controller for simultaneously detecting position of the blind and tilt orientation of at least one vane element of the blind; and at least one output device operably connected to the controller for controlling at least one of the vane element tilt orientation and position of the blind.

2. The system of claim 1, wherein the controller further comprises: a receiver program module comprising at least one computer executable instruction utilized to decode received instructions.

3. The system of claim 2, wherein the controller further comprises a device controller module comprising at least one computer executable instruction utilized to control the operation of the at least one output device.

4. The system of claim 3, wherein controller further comprises a detector program module comprising at least one computer executable instruction utilized to control and process information received from the at least the one detector.

5. The system of claim 4, wherein the controller further comprises a timer program module comprising at least one computer executable instruction utilized to control the frequency at which a detection signal is requested from the at least one detector by the controller.

6. The system of claim 5, wherein the frequency of detection signal requests is approximately once every five milliseconds.

7. The system of claim 5, wherein the frequency of detection signal requests is related to a desired rotational speed of an actuator used to reposition and/or reorient the tilt of the vane element of the blind.

8. The system of claim 5, wherein the controller further comprises a system controller program module comprising at least one computer executable instruction utilized in routing inputs to and outputs from at least one of the receiver program module, device controller module, and timer program module.

9. The system of claim 8, wherein the system controller program module further comprises a watch-dog timer.

10. The system of claim 1, wherein the controller further comprises at least one of a receiver program module, a device controller module, a timer program module and a system controller module.

11. The system of claim 10, further comprising a receiver having a receiver program module compatible with receiving and decoding instructions communicated in at least one of an infra-red and a radio frequency signal.

12. The system of claim 10, further comprising a remote control device utilized to communicate at least one of a position and an orientation instruction to the controller.

13. The system in claim 1, wherein the blind further comprises:

a header;

a plurality of horizontal vanes extending from the header;

a shaft;

at least one guide wire operably connecting the plurality of horizontal vanes to the shaft; and power motor operably connected to the shaft.

14. The system of claim 13, further comprising: a detector, operably connected to the shaft, for determining at least one of the rate and direction of rotation of the shaft.

15. The system of claim 14, wherein the detector comprises a rotary interrupter and an opto-coupler which collectively detect movement of the shaft and generate output signals indicative of the same for communication to the controller.

16. The system of claim 1, wherein the controller outputs control signal consisting of at least one of a polarity signal, run signal, and speed signal.

17. An apparatus for controlling the position of a blind comprising:

a controller; and a computer readable medium, operably connected to the controller, further comprising:

a detector program module which utilizes signals provided by a detector to determine at least one of the position, direction and rate of movement of a shaft from which a plurality of vanes extend, and the tilt orientation of at least one of the plurality of the vanes, and communicates at least one detector output signal indicative thereof;

a receiver program module, which decodes received operating instructions, and outputs decoded signals; and a device controller module which receives and utilizes both the at least one detector output signal and the decoded signal to control the operation of at least one actuator, wherein the at least one actuator facilitates the rotation of the shaft.

18. The apparatus of claim 17, wherein the computer readable medium further comprises:

a timer program module which outputs signals indicating the frequency at which a detector outputs signals is utilized by the detector program module.

19. The apparatus of claim 18, wherein the timer program module manages power consumed by the apparatus.

20. The apparatus of claim 18, wherein the timer program module includes at least one computer executable instruction that instructs the controller to manage power consumed by the apparatus by periodically configuring at least one input device or output device into standby mode.

21. A method for controlling at least one of the position, movement and tilt orientation of at least one vane element of a blind, comprising:

receiving an input signal from a detector, the detector comprising an opto-coupler and a rotary interrupt, specifying an initial position and tilt orientation of at least one element of a blind;

receiving an operating instruction from at least one user interface;

determining when a hard stop event will occur; and controlling a position of the blind based on at least one of the detector input signal, the received operating instruction, and the hard stop event determination.

22. The method of claim 21, further comprising:

determining a range of positions based on the initial position indicated by the at least one detector; and determining the speed and movement of the blind with the at least one detector.

23. The method of claim 22, further comprising:

changing a status of a blind position based on the hard stop event determination;

recalling a stored blind position; and calculating a number of positions to be traversed by the blind based on the stored blind position and a new instruction containing desired blind parameters.

24. The method of claim 23, further comprising:

controlling a velocity and torque of the blind to avoid hard stops; and controlling blind movement by periodically querying the detector.

25. The method of claim 23, wherein the calculating of a number of positions to traversed further comprises:

periodically querying the detector, wherein the detector comprises a rotary interrupter having a predetermined number of teeth and gaps adjacent to an opto-coupler configured to translate the number of teeth and gaps into one or more communication signals based on the passing of teeth and gaps through an optical beam generated by the opto-coupler.

26. The method of claim 25 further comprising:

associating the translated number of teeth and gaps detected within a given time period to determine continuous motion of the blind within the predetermined sampling rate; and determining a change of status of a blind position based on an absence of changes in teeth and gaps to further determine whether a hard stop is reached.

27. The method of claim 26, further comprising:

upon recalling a stored blind position, determining a range of positions relative to the desired blind parameters, whereby a destination position is determined; and controlling the velocity and torque of a motor used to rotate the shaft based on a relative distance to the destination position.

* * * * *